US012681765B1

(12) United States Patent
Kostakis et al.

(10) Patent No.: US 12,681,765 B1
(45) Date of Patent: Jul. 14, 2026

(54) OPTIMAL FREE POOL PREPROVISIONING

(71) Applicant: Snowflake Inc., Bozeman, MT (US)

(72) Inventors: Orestis Kostakis, Redmond, WA (US); Murray Marvin Stokely, III, Los Altos, CA (US); Piotr Adam Tabor, Warsaw (PL); Cong Wang, Sammamish, WA (US); Lawrence Douglas Webley, Woodinville, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/285,176

(22) Filed: Jul. 30, 2025

(51) Int. Cl.
*G06F 9/50* (2006.01)
(52) U.S. Cl.
CPC .... *G06F 9/5038* (2013.01); *G06F 2209/5011* (2013.01); *G06F 2209/5019* (2013.01)
(58) Field of Classification Search
None
See application file for complete search history.

(56) References Cited

U.S. PATENT DOCUMENTS

2008/0172671 A1* 7/2008 Bouillet ............. G06F 11/3447
718/104
2023/0222403 A1* 7/2023 Niu ........................ G06Q 50/47
705/7.13
2025/0291691 A1* 9/2025 Neuberger .......... G06F 11/3006

OTHER PUBLICATIONS

AWS, "Amazon EC2 Auto Scaling", [Online] Retrieved from the internet: <docs.aws.amazon.com/pdfs/autoscaling/ec2/userguide/as-dg.pdf#ec2-auto-scaling-scaling-cooldowns>, (2025), 1265 pgs.
Bhanu, Pasan Guruge, et al., "Time series forecasting-based Kubernetes autoscaling using Facebook Prophet and Long Short-Term Memory", Frontiers, [Online] Retrieved from the internet: <www.frontiersin.org/journals/computer-science/articles/10.3389/fcomp.2025.1509165/full>, (Feb. 19, 2025), 13 pgs.
Boghani, Shayan, et al., "Cloud Resource Allocation with Convex Optimization", [Online] Retrieved from the internet: <www.researchgate.net/publication/390247159_Cloud_Resource_Allocation>, (Mar. 27, 2025), 10 pgs.
Danilo, Ardagna, et al., "Special Issue on Performance and Resource Management in Big Data Applications", 1 pg.
Flunkert, Valentin, et al., "Asimple and effective predictive resource scaling heuristic for large-scale cloud applications", [Online] Retrieved from the internet: <arxiv.org/pdf/2008.01215>, (Aug. 3, 2020), 5 pgs.

(Continued)

*Primary Examiner* — Eric C Wai
(74) *Attorney, Agent, or Firm* — Schwegman Lundberg & Woessner, P.A.

(57) ABSTRACT

A cloud data platform determines a set of candidate pre-provisioning times for compute resources to be provisioned from a cloud provider service to a free pool maintained by the cloud platform, the set of candidate pre-provisioning times being based on a demand of compute resources (N) and a target time. For each candidate pre-provisioning time: the cloud data platform finds similar historical periods based on historical distribution of provisioning latencies. For each historical period of the similar historical periods, the cloud data platform determines a minimum number of compute resources (M) to provision at the candidate pre-provisioning time so that at least N compute resources are ready by the target time within a specified confidence.

20 Claims, 11 Drawing Sheets

(56) References Cited

OTHER PUBLICATIONS

Hao, Jianwei, et al., "An Empirical Analysis of VM Startup Times in Public IaaS Clouds: An Extended Report", (Jul. 7, 2021), 13 pgs.

Huang, Darong, et al., "CloudProphet: A Machine Learning-Based Performance Prediction for Public Clouds", [Online] Retrieved from the internet: <arxiv.org/pdf/2309.16333>, (Sep. 28, 2023), 15 pgs.

Jin, Yihong, et al., "Scalability Optimization in Cloud-Based AI Inference Services: Strategies for Real-Time Load Balancing and Automated Scaling", [Online] Retrieved from the internet: <arxiv.org/pdf/2504.15296v1>, (Apr. 16, 2025), 9 pgs.

Kidane, Lidia, "Accurate and Low-Overhead Workload Prediction for Cloud Management", Doctoral Thesis May 2025 Department of Computing Science Umea University Sweden, [Online] Retrieved from the internet: <diva-portal.org/smash/get/diva2:1956902/FULLTEXT01.pdf>, (May 2025), 50 pages.

Kondrashov, Leonid, et al., "Melding the Serverless Control Plane with the Conventional Cluster Manager for Speed and Compatibility", [Online] Retrieved from the internet: <arXiv:2505.24551v1>, (May 30, 2025), 15 pgs.

Malekimajd, Marzieh, et al., "Optimal Map Reduce Job Capacity Allocation in Cloud Systems", [Online]. Retrieved from the Internet: <URL: www.sigmetrics.org/per/per_si_bigdata.pdf>, (Jun. 2, 2025), 11 pgs.

Marcoa, S Netto, et al., "HPC Cloud for Scientific and Business Applications: Taxonomy, Vision, and Research Challenges", ACM Computing Surveys, vol. 51, No. 1, Article 8, [Online] Retrieved from the internet: <arxiv.org/pdf/1710.08731>, (Feb. 2, 2018), 29 pgs.

Reidys, Benjamin, et al., "Coach: Exploiting Temporal Patterns for All-Resource Oversubscription in Cloud Platforms", [Online] Retrieved from the internet: <arXiv:2501.11179v2>, (Mar. 19, 2025), 18 pgs.

Rosa, Andrea, et al., "Demystifying Casualties of Evictions in Big Data Priority Scheduling", [Online]. Retrieved from the Internet: <URL:www.sigmetrics.org/per/per_si_bigdata.pdf>, (Jun. 2, 2025), 10 pgs.

Seo, Eunil, et al., "LA-IMR: Latency-Aware, Predictive In-Memory Routing & Proactive Autoscaling for Tail-Latency-Sensitive Cloud Robotics", [Online] Retrieved from the internet: <arxiv.org/pdf/2505.07417v1>, (May 12, 2025), 11 pgs.

Shahin, Ashraf A, "Automatic Cloud Resource Scaling Algorithm based on Long Short- Term Memory Recurrent Neural Network", (IJACSA) International Journal of Advanced Computer Science and Applications, vol. 7, No. 12, (2016), 7 pgs.

Stokely, Murray, et al., "Shaved Ice: Optimal Compute Resource Commitments for Dynamic Multi-Cloud Workloads", [Online] Retrieved from the internet: <arXiv:2503.10235v2>, (Apr. 30, 2025), 12 pgs.

Sumalatha, M. R., et al., "A Review on Resource Provisioning Algorithms Optimization Techniques in Cloud Computing", [Online] Retrieved from the internet: <philarchive.org/archive/SUMARO>, (2025), 5 pgs.

Swain, Smruti Rekha, et al., "Efficient Resource Management In Cloud Environment", (Jun. 24, 2022), 9 pgs.

Tan, Jian, et al., "Multi-resource fair sharing for multiclass workflows", [Online]. Retrieved from the Internet: <URL: www.sigmetrics.org/per/per_si_bigdata.pdf>, (Jun. 2, 2025), 7 pgs.

Wang, Han, et al., "COUNTER: Cluster GCN based Energy Efficient Resource Management for Sustainable Cloud Computing Environment", [Online] Retrieved from the internet: <arxiv.org/html/2504.09995v1>, (Apr. 14, 2025), 6 pgs.

Wang, Yuqing, et al., "Intelligent Resource Allocation Optimization for Cloud Computing via Machine Learning", Advances in Computer, Signals and Systems Clausius Scientific Press, Canada, ISSN 2371-8838 Vol. 9 No. 1, [Online] Retrieved from the internet: <arxiv.org/pdf/2504.03682>, (2025), 9 pgs.

Webley, Lawrence, "Core RPP Algothim", (May 2025), 23 pages.

Wei, Xiaohan, et al., "Data Center Server Provision: Distributed Asynchronous Control for Coupled Renewal System", [Online] Retrieved from the internet: <arxiv.org/pdf/1512.01609>, (Dec. 17, 2016), 15 pgs.

Ying, Yijun, et al., "On Energy-aware Allocation and Execution for Batch and Interactive MapReduce", [Online]. Retrieved from the Internet: <URL: www.sigmetrics.org/per/per_si_bigdata.pdf>, (Jun. 2, 2025), 9 pgs.

Yong, Xiang, "Debugging OpenStack Problems Using a State Graph Approach", [Online] Retrieved from the internet: <iiis.tsinghua.edu.cn/~weixu/files/apsys-xiang.pdf>, (2016), 1-8.

Yue, Tan, et al., "An Adaptive Learning Approach for Efficient Resource Provisioning in Cloud Services", [Online]. Retrieved from the Internet: <URL: www.sigmetrics.org/per/per_si_bigdata.pdf>, (Jun. 2, 2025), 9 pgs.

Zhang, Wei, et al., "Minimizing Interference and Maximizing Progress for Hadoop Virtual Machines", Department of Computer Science, The George Washington University, [Online]. Retrieved from the Internet: <URL: www.sigmetrics.org/per/per_si_bigdata.pdf>, (Jun. 2, 2025), 10 pgs.

Zhang, Zhuoyao, et al., "Exploiting Cloud Heterogeneity to Optimize Performance and Cost of MapReduce Processing", [Online]. Retrieved from the Internet: <URL:www.sigmetrics.org/per/per_si_bigdata.pdf>, (Jun. 2, 2025), 13 pgs.

Zhang, Ziyi, et al., "Predictive Control and Regret Analysis of Non-Stationary MDP with Look-ahead Information", [Online] Retrieved from the internet: <arXiv:2409.08434v2>, (Nov. 14, 2025), 21 pgs.

* cited by examiner

400

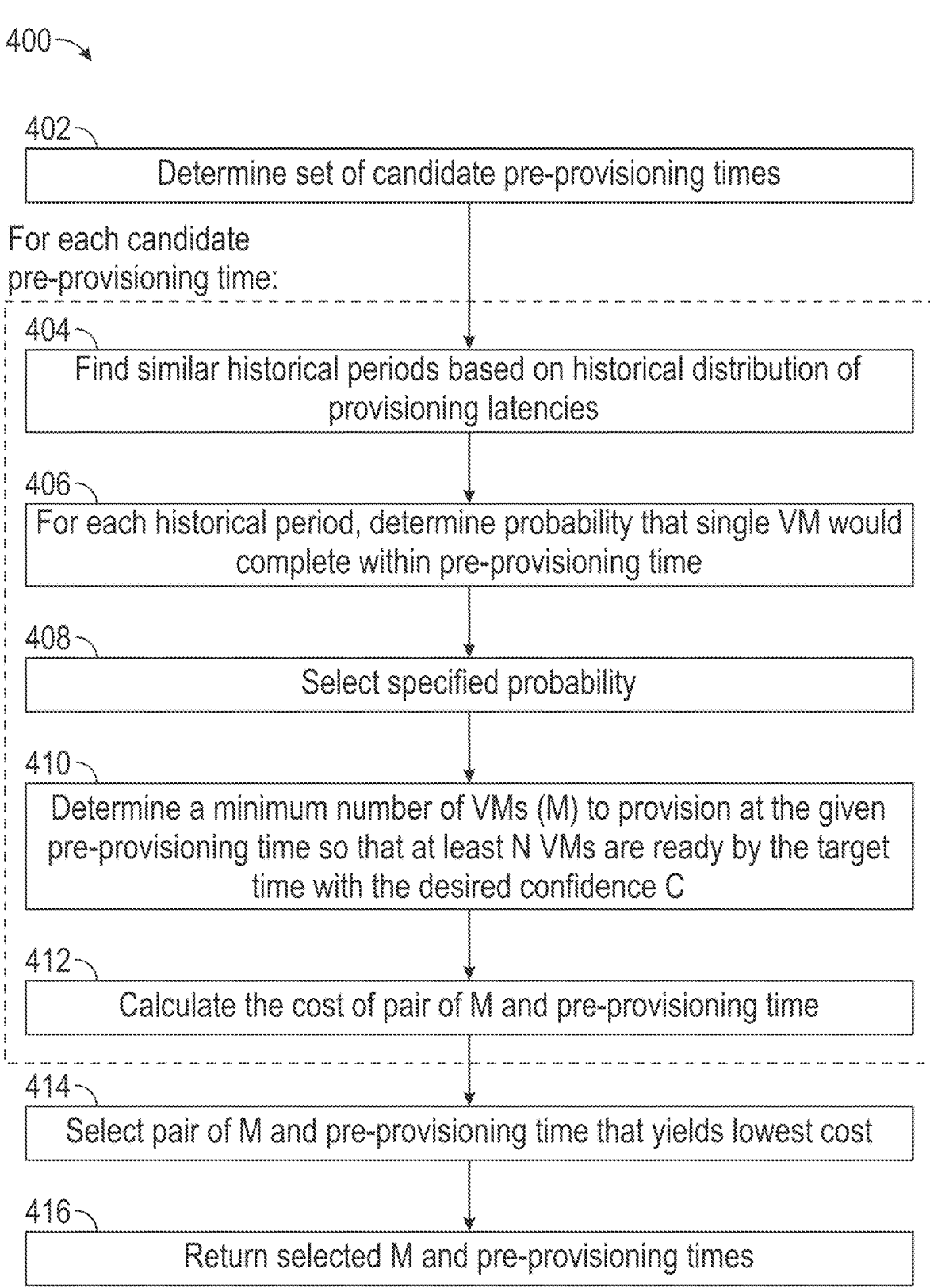

402
Determine set of candidate pre-provisioning times

For each candidate
pre-provisioning time:

404
Find similar historical periods based on historical distribution of provisioning latencies 406
For each historical period, determine probability that single VM would complete within pre-provisioning time 408
Select specified probability 410
Determine a minimum number of VMs (M) to provision at the given pre-provisioning time so that at least N VMs are ready by the target time with the desired confidence C 412
Calculate the cost of pair of M and pre-provisioning time 414
Select pair of M and pre-provisioning time that yields lowest cost 416
Return selected M and pre-provisioning times

FIG. 4

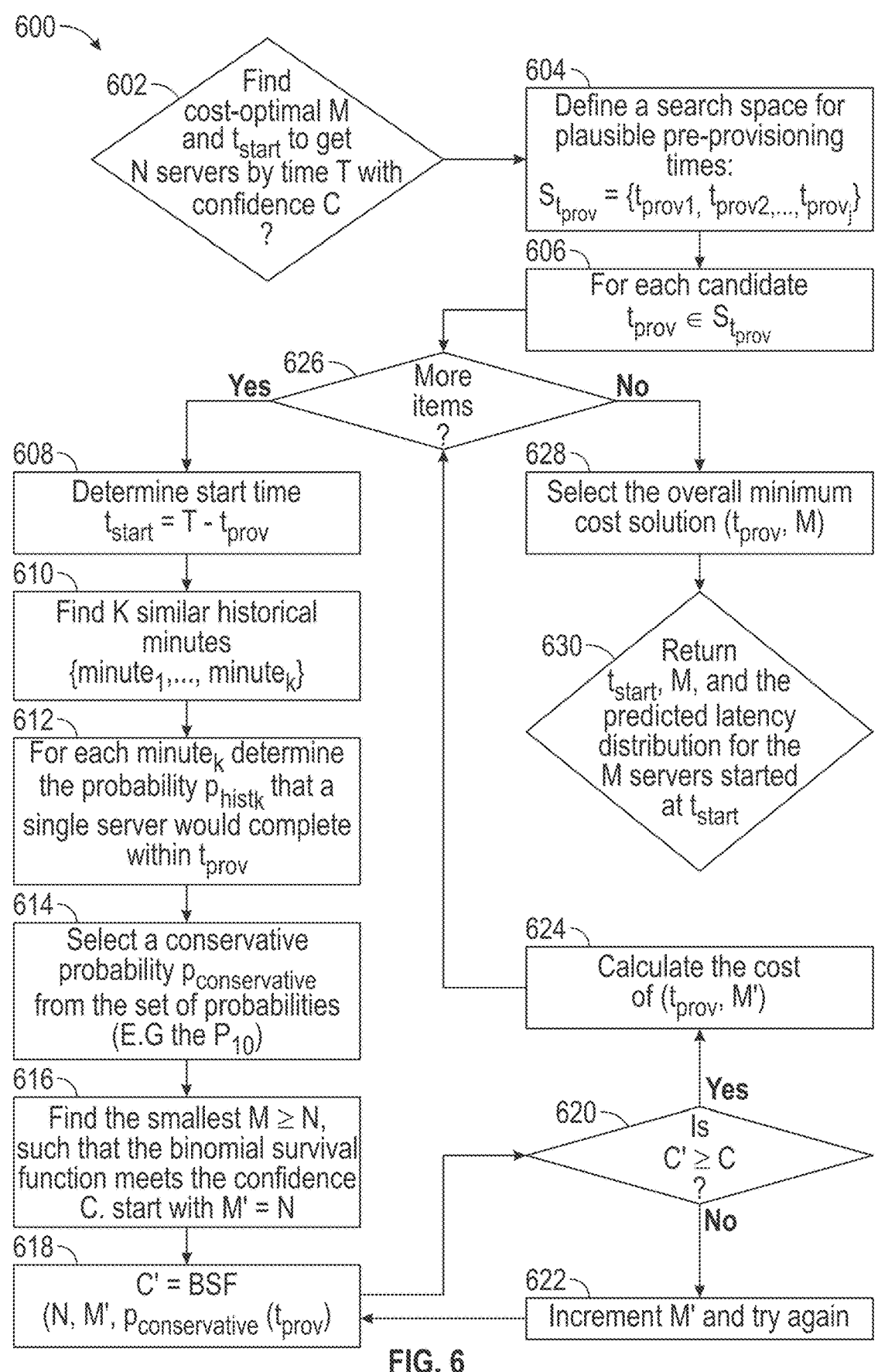

600

602 — Find cost-optimal M and $t_{start}$ to get N servers by time T with confidence C ?

604 — Define a search space for plausible pre-provisioning times: $S_{t_{prov}} = \{t_{prov1}, t_{prov2},..., t_{prov_j}\}$ 606 — For each candidate $t_{prov} \in S_{t_{prov}}$ 626 — More items ?

Yes

No

608 — Determine start time $t_{start} = T - t_{prov}$

628 — Select the overall minimum cost solution ($t_{prov}$, M)

610 — Find K similar historical minutes $\{minute_1,..., minute_k\}$

612 — For each $minute_k$ determine the probability $p_{histk}$ that a single server would complete within $t_{prov}$ 630 — Return $t_{start}$, M, and the predicted latency distribution for the M servers started at $t_{start}$ 614 — Select a conservative probability $p_{conservative}$ from the set of probabilities (E.G the $P_{10}$)

624 — Calculate the cost of ($t_{prov}$, M')

616 — Find the smallest M ≥ N, such that the binomial survival function meets the confidence C. start with M' = N 620 — Is C' ≥ C ?

Yes

No

618 — C' = BSF (N, M', $p_{conservative}$ ($t_{prov}$)

622 — Increment M' and try again

| Time | $T_0$ - Now | $T_1$ | $T_2$ | $T_3$ |
|---|---|---|---|---|
| Free Pool Size at Window Start | 200 | 100 | 0 | -100 |
| Predicted Demand During Window | 100 | 100 | 100 | 100 |

FIG. 8

OPTIMAL FREE POOL PREPROVISIONING

TECHNICAL FIELD

Embodiments of the disclosure relate generally to cloud data platforms and, more specifically, to free pool preprovisioning utilizing predictive provisioning latency and overprovisioning.

BACKGROUND

Data platforms are widely used for data storage and data access in computing and communication contexts. Cloud data platforms desire to deliver rapid, on-demand compute resources to meet fluctuating customer workloads. To achieve fast response times, these platforms typically can maintain a "free pool" of virtual machines (VMs) that can be allocated quickly when customer demand arises. Maintaining the right size for the free pool can be challenging. For example, maintaining an oversized free pool can lead to significant idle resource costs, while an undersized pool can risk delayed services.

BRIEF DESCRIPTION OF THE DRAWINGS

The present disclosure will be understood more fully from the detailed description given below and from the accompanying drawings of various embodiments of the disclosure.

FIG. 4 is a flowchart of a method for predicting provisioning latency, in accordance with some embodiments of the present disclosure.

FIG. 6 is a flowchart of a method for predicting provisioning latency, in accordance with some embodiments of the present disclosure.

FIG. 8 shows an example scenario of projected free pool sizes and demands during future time windows, in accordance with some embodiments of the present disclosure.

DETAILED DESCRIPTION

Figure 1:
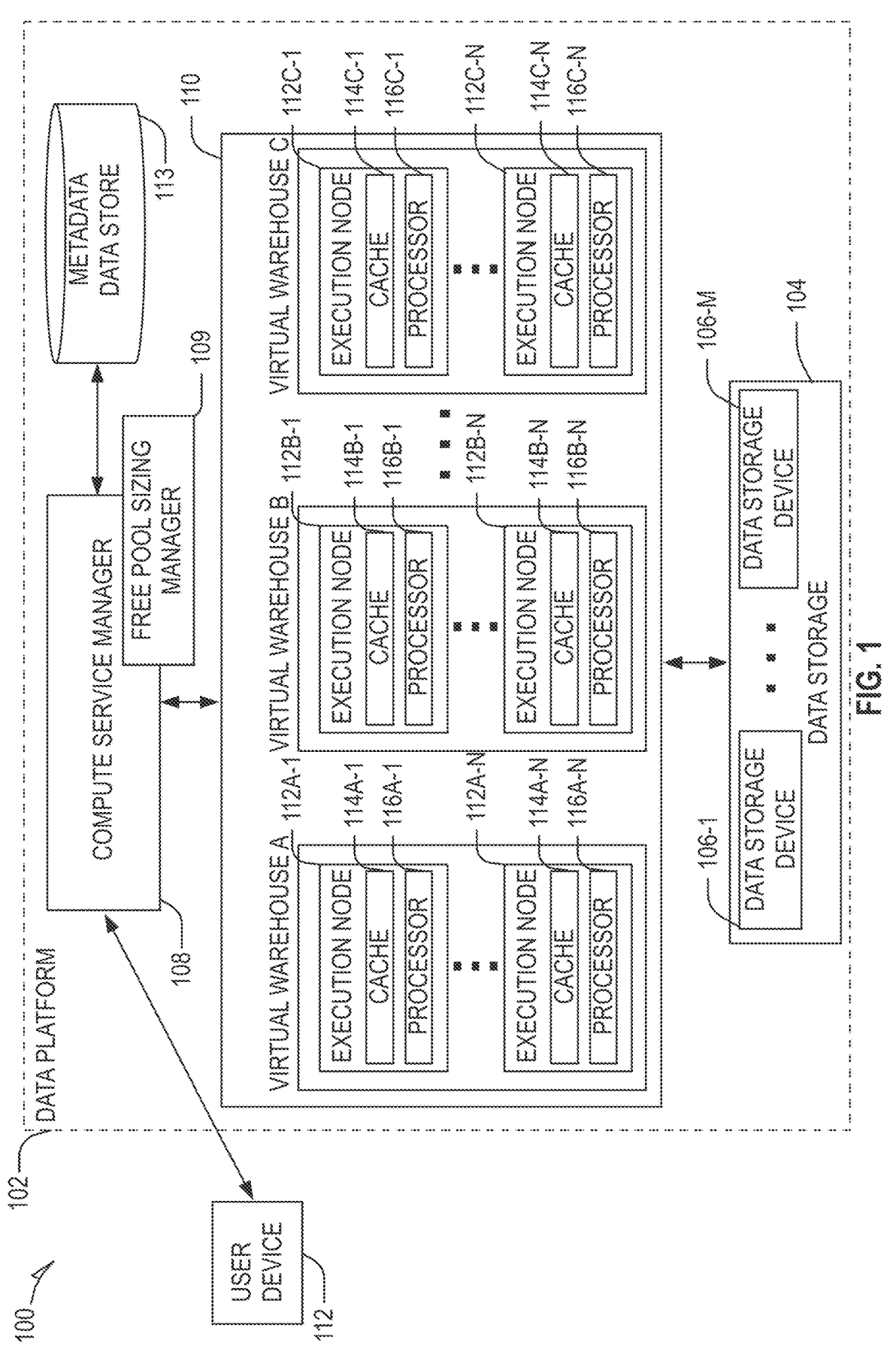
FIG. 1 illustrates an example computing environment that includes a cloud data platform, in accordance with some embodiments of the present disclosure.

Reference will now be made in detail to specific example embodiments for carrying out the inventive subject matter.

Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As described in further detail below, cloud data platforms utilize a "free pool" of preprovisioned virtual machines (VMs) to ensure rapid response times for customer workloads. However, conventional approaches to managing these free pools suffer from several limitations. For example, some conventional systems typically rely on fixed time windows for provisioning predictions and static provisioning strategies. These approaches fail to account for dynamic factors such as real-time provisioning latency, workload variability, and cloud provider performance fluctuations.

The free pool sizing techniques described herein address these and other limitations by introducing a dynamic, predictive approach to free pool management. For example, these techniques can incorporate a provisioning latency predictor that dynamically estimates the time required to provision virtual machines (VMs) based on real-time and historical data. In some examples, the predictor utilizes a k-NN model to identify historical periods with comparable conditions, enabling the system to generate accurate latency distributions for future provisioning events. By analyzing these distributions, the system determines the optimal preprovisioning time and overprovisioning factor to ensure that the required number of VMs is available with a specified confidence level (e.g., 99%).

By dynamically adjusting the quantity of virtual machines to provision and the timing of provisioning actions, the system reduces idle resource costs while sustaining reliable service performance. For instance, during periods of reduced demand, the system can decrease the free pool size by releasing surplus virtual machines, whereas during periods of heightened demand, provisioning can be initiated earlier to accommodate extended latencies. The described techniques can handle workload variability and long-tail latency events. For example, by overprovisioning a calculated number of VMs beyond immediate demand, the system mitigates the risk of delayed resource availability due to unpredictable provisioning delays. This approach is particularly effective in cloud environments where provisioning latencies exhibit significant variability.

Moreover, rapid predictive preprovisioning techniques, as described herein, can manage the size of a cloud compute free pool with high efficiency and reliability. At each decision point, the system can project future free pool states by analyzing factors, such as predicted net and peak demand, anticipated server returns, and real-time provisioning latency. For every future time window, the system can determine whether a deficit in available VMs is likely to occur. If a deficit is projected, the system can invoke a predictive provisioning latency model to calculate the optimal time to start provisioning and the number of VMs to launch. In some examples, VMs are only provisioned if there is an immediate need to provision to meet a future deficit. If no immediate provisioning is required, the system can evaluate whether excess VMs can be safely released from the free pool without risking future shortages. By integrating overprovisioning optimization and rapid predictive preprovisioning, cloud platforms can maintain high availability and responsiveness while significantly reducing idle resource costs.

FIG. 1 illustrates an example computing environment 100 that includes a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 113, an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources including storage devices within the data storage 104. The data storage 104 comprises a plurality of computing machines and provides on-demand computer system resources such as data storage and computing power to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

As shown, the compute service manager 108 includes a free pool sizing manager 109 that is responsible for maintaining the free pool from which different virtual warehouses can obtain VMs. Further details of the operation of the free pool sizing manager 109 are discussed below.

The compute service manager 108 is also in communication with a user device 112. The user device 112 corresponds to a user of one of the multiple client accounts supported by the cloud data platform 102. In some implementations, the compute service manager 108 does not receive any direct communications from the user device 112 and only receives communications concerning jobs from a queue within the cloud data platform 102.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 113 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 113, execution platform 110, and data storage 104 are shown in FIG. 1 as individual discrete components. However, each of the compute service manager 108, metadata data store 113, execution platform 110, and data storage 104 may be implemented as a distributed system (e.g., distributed across multiple systems/platforms at multiple geographic locations). Additionally, each of the compute service manager 108, metadata data store 113, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

Figure 2:
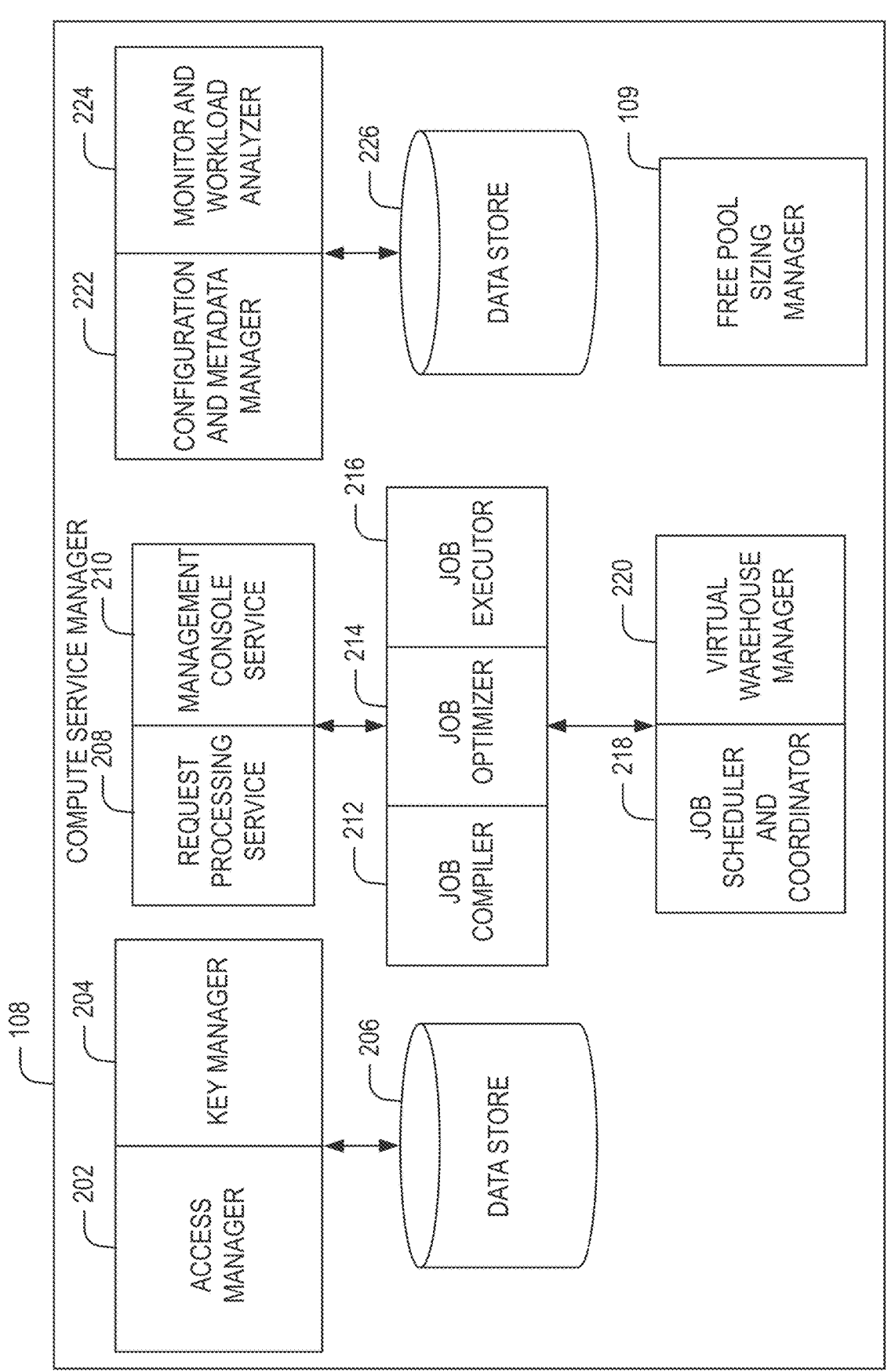
FIG. 2 is a block diagram illustrating components of a compute service manager of the cloud data platform, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 113, or any other storage device or system.

In addition, as mentioned above, the compute service manager 108 includes a free pool sizing manager 109 that is responsible for maintaining the free pool from which different virtual warehouses can obtain VMs (also referred to as compute resources or servers). Further details regarding the functionality of the free pool sizing manager 109 109 are discussed below.

Figure 3:
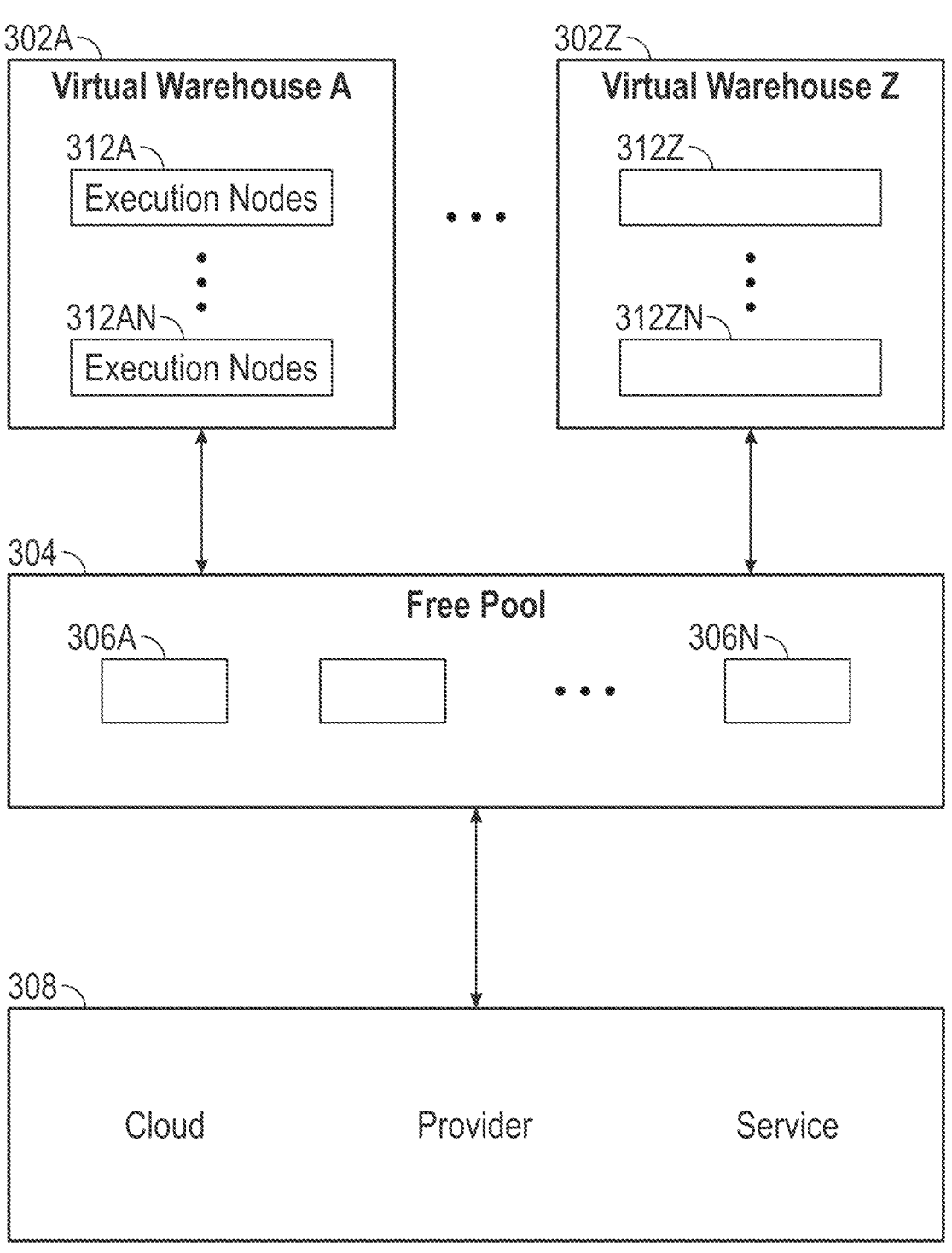
FIG. 3 is a simplified block diagram showing a framework for free pool provisioning, in accordance with some embodiments of the present disclosure.

FIG. 3 is a simplified block diagram showing a framework for free pool provisioning, in accordance with some embodiments of the present disclosure. A plurality of virtual warehouses 302A-302Z are provided by the cloud data platform, as described above. Each virtual warehouse includes one or more execution nodes 312A-312AN (also referred to as virtual machines (VMs)), as described above. The virtual warehouses 302A-302Z may be provided for a plurality of accounts of the cloud data platform as described above.

The virtual warehouses 302A-302Z may be started, stopped, and resumed based on workloads. The execution nodes 312A-312AZ may be added to the virtual warehouses 302A-302Z from a free pool 304 or released from the virtual warehouses 302A-302Z back to the free pool 304. For example, when stopped or paused, the virtual warehouse may release its VMs back to the free pool. When the virtual warehouses are resumed, the virtual warehouse may add VMs from the free pool.

The free pool 304 may include preprovisioned VMs 306A-306N that have been provisioned from a cloud provider service 308 (e.g., AWS, Azure, GCP). The VMS 306A-306N are preprovisioned by having the software of the cloud data platform loaded and set up in advance so that they are made ready in advance before they are actually needed by a workload request. The free pool 304 serves as a buffer of preprovisioned VMs that are ready to be assigned to a virtual warehouse. The free pool 304 may add VMs from the cloud provider service 308 as demand increases, and the free pool 304 may release VMs to the cloud provider service 308 as demand decreases.

Next, different techniques for sizing the free pool are described. In cloud resource management, the fundamental challenge is to ensure that the free pool contains a sufficient number of servers to meet predicted future demand at any given time. The process may begin with a demand prediction that estimates the number of servers required for upcoming workloads based on historical and real-time data. Once this demand is forecasted, the system may determine not only how many VMs to provision, but also when to initiate provisioning to guarantee availability while minimizing idle costs.

In some aspects, the system can be configured to predict provisioning latency to optimize the size of the VM free pool. For example, the system may replace fixed or static time windows with real-time and dynamic provisioning durations. The system may also determine an overprovisioning factor where a greater number of VMs are provisioned as needed to ensure that the needed number of VMs are provisioned on time.

Determining dynamic provisioning times and an optimal overprovisioning factor provides substantial technical benefits for cloud resource management. By continuously analyzing real-time and historical data, the system can accurately predict when to initiate provisioning actions and how many extra VMs to launch beyond the immediate demand. These optimizations allow the platform to minimize the risk of delayed resource availability caused by unpredictable or long-tail provisioning latencies, while also reducing unnecessary idle time and associated costs. The dynamic approach ensures that resources are provisioned just early enough to meet service-level objectives, but not so early that they sit unused. The calculated overprovisioning factor increases the probability that the required number of VMs will be ready on time, even under adverse or variable cloud provider conditions. These techniques enable the system to deliver highly reliable, cost-efficient, and responsive cloud services, adapting in real time to changing workloads and infrastructure performance.

As described in further detail below, the predicting provisioning latency component can leverage advanced statistical and machine learning techniques to accurately estimate how long it will take to provision a specified number of VMS under current and anticipated conditions. By maintaining a historical database of provisioning events and continuously modeling real-time latency trends, the system can use a k-nearest neighbor (k-NN) approach to identify historical situations similar to the present context, such as time of day, workload, and recent provisioning activity. For each candidate provisioning lead time, the system can calculate a conservative probability that a VM will be ready in time and apply a binomial survival function to determine the optimal number of VMs to launch in order to meet a target confidence level (e.g., 99%). This approach enables the system to dynamically adjust both the timing and quantity of provisioning actions, accounting for long-tail latency events and cloud provider variability.

FIG. 4 is a flowchart of a method 400 for predicting provisioning latency, in accordance with some embodiments of the present disclosure. In some examples, the method 400 may be executed by a cloud data platform 102, in particular a free pool sizing manager 109, as described above. The objective or goal of method 400 is to estimate how many VMs to initiate provisioning (M) from the cloud provider service and when to start provisioning them (T_prov), so that the immediate demand (N) of VMs are provisioned by the target time (T) with a specified level of confidence (e.g., 99% confidence).

At operation 402, the system (e.g., cloud data platform 102, free pool sizing manager 109) determines a set of plausible or candidate pre-provisioning times based on N and T. Next, an iterative process for each candidate pre-provisioning times is executed to determine a value M for each candidate pre-provisioning time.

At operation 404, for the respective candidate pre-provisioning time, the system finds similar historical periods based on historical distribution of provisioning latencies. In some examples, a k-Nearest Neighbor (k-NN) approach may be employed to find historical periods (e.g., minutes) similar to the current context (e.g., time of day, day of week, number of VMs being provisioned, recent launches).

At operation 406, for each historical period, the system determines a probability that a single VM would complete within the pre-provisioning time based on current and historical data. A set of probabilities are generated based on the historical periods.

At operation 408, the system selects a specified probability. For example, the system may select a conservative probability (e.g., $10^{th}$ percentile) to account for variance and risk.

At operation 410, the system determines a minimum number of VMS (M) to provision at the given pre-provisioning time so that at least N VMs are ready by the target time with the desired confidence C (e.g., 99% confidence) based on the selected probability. For example, the system applies a binomial survival function to determine a minimum number of VMs (M) to provision at the given pre-provisioning time so that at least N VMs are ready by the target time with the desired confidence C (e.g., 99% confidence), where the selected probability is a variable in the binomial survival function.

In some examples, the system may use other techniques, such as bootstrapping. For example, the system may identify a set of historical periods (using features such as time of day, workload, and recent activity) that closely match the present context. The system may then repeatedly sample from these historical periods, with replacement, to simulate multiple possible outcomes for provisioning events. By aggregating the results of these simulated samples, the system constructs an empirical distribution of provisioning latencies, which can be used to estimate the likelihood that a required number of resources will be ready within a given time window.

At operation 412, the system calculates the cost of the pair of M and pre-provisioning time. The calculated cost may include a cost metric associated with provisioning the servers at the specified pre-provisioning time. Operations 404-412 may be iteratively performed for each candidate pre-provisioning time in the set of candidate pre-provisioning times. At operation 414, the system selects the pair of M and pre-provisioning time that yields the lowest cost.

At operation 416, the system returns the selected M number of VMs to provision with optimal pre-provisioning time such that at least N number of VMs are provisioned by the target time with the specified confidence C.

Figure 5:
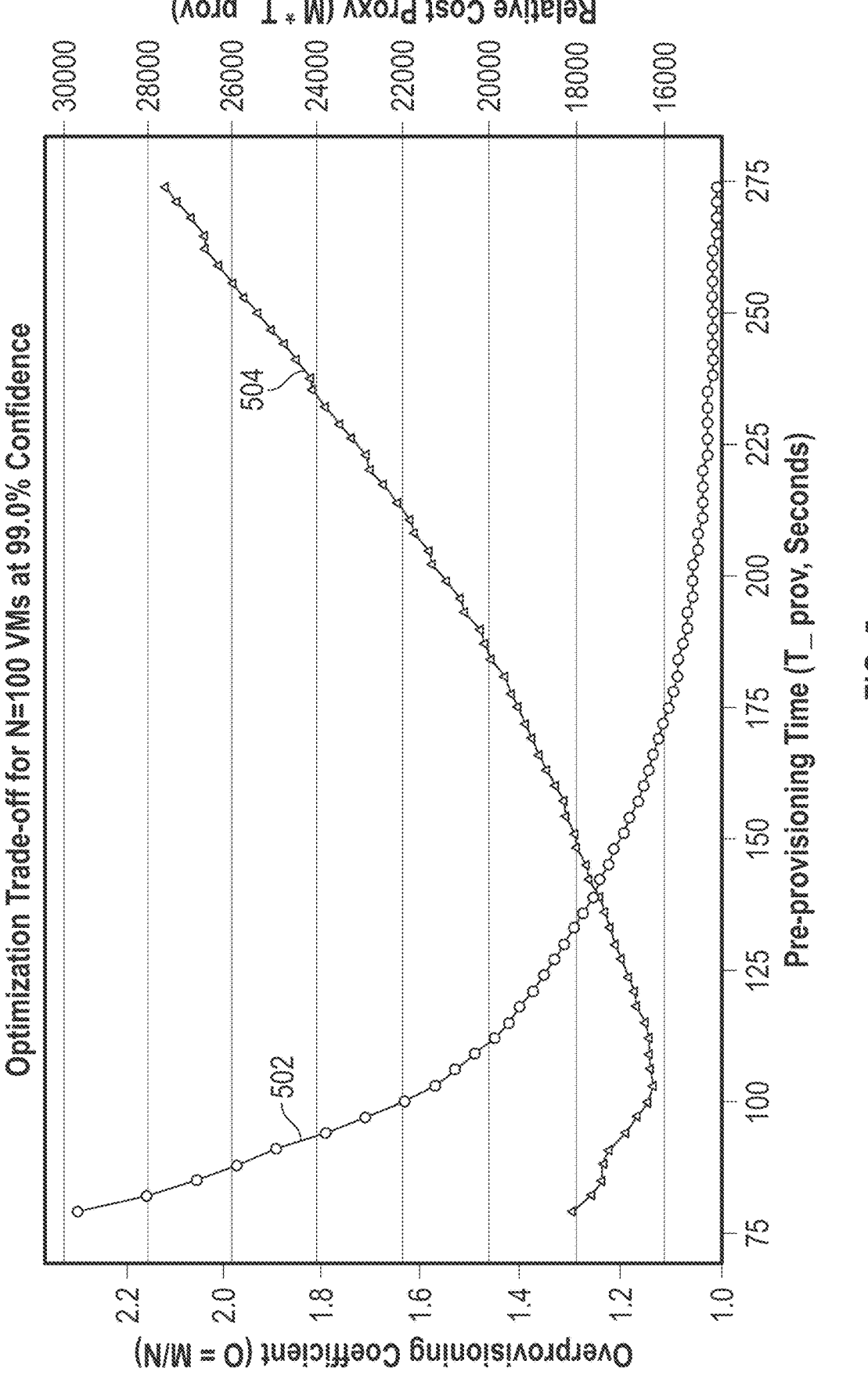
FIG. 5 shows a graph showing an example relationship of pre-provisioning time, overprovisioning, and cost, in accordance with some embodiments of the present disclosure.

FIG. 5 shows a graph showing an example relationship of pre-provisioning time, overprovisioning, and cost, in accordance with some embodiments of the present disclosure. The x-axis shows the various pre-provisioning times (T_prov) in seconds. Relative to the left axis, plot 502 shows the overprovisioning coefficient (how many times more instances to provision than the desired 100 instances). Relative to the right axis, plot 504 shows the relative cost (in instance-minutes).

With respect to the example in the graph of FIG. 5, to achieve 100 VMs with 99% confidence at the lowest cost proxy, the optimal (minimum cost proxy) solution is pre-provisioning time (T_prov) of 103 seconds, 1.58 overprovisioning coefficient (M/N) of 1.580 (i.e., M=158 VMs to provision) with a minimum cost proxy of 16274. In comparison, a naive solution (i.e., no overprovisioning so that M=N) would yield starting 100 VMs with a provisioning time of 325 seconds with 99% confidence and a cost proxy of about 32500. Thus, the naive strategy cost would be 99.7% more expensive than the optimal (minimum cost proxy) solution with over-provisioning.

FIG. 6 is a flowchart of a method 600 for predicting provisioning latency, in accordance with some embodiments of the present disclosure. In some examples, the method 600 may be executed by a cloud data platform 102, in particular a free pool sizing manager 109, as described above.

At operation 602, the system sets an objective for finding a cost-optimal solution, which includes a M number of servers (i.e., VMs) and start time ($t_{start}$) in order to obtain N servers by a target time T with confidence C, where N, T, and C are known and set.

At operation 604, the system defines a search space for $t_{prov}$, where a set of plausible pre-provisioning times, $S_{t_{prov}} = \{t_{prov_1}, t_{prov_2}, \ldots, t_{prov_j}\}$, is selected. This range can be heuristically determined from historical latency percentiles (e.g., $P_{50}$ to $P_{100} \times$ factor).

At operation 606, an iterative process for each candidate pre-provisioning times is executed to determine a value M for each candidate pre-provisioning time ($t_{prov}$ E Stprov).

At operation 608, for the respective candidate pre-provisioning time, the system determines a start time for the pre-provisioning time, $t_{start}=T-t_{prov}$.

At operation 610, the system queries a k-NN model to find K historical minutes, Neighbors $(t_{start})=\{minute_1, \ldots, minute_K\}$, that are most similar to the conditions at $t_{start}$. Similarity may be based on features like minute of hour, hour of day, day of week, recent launches, and M (the number of servers being provisioned).

At operation 612, the system calculates historical probabilities. For each neighboring historical minute $(minute_k \in Neighbors(t_{start}))$, the system determines the empirical probability $p_{hist_k}(t_{prov})$ that a single server launched in $minute_k$ would complete within $t_{prov}$. This may be done based on the actual latencies $D_k$ of servers launched in $minute_k$:

$$p_{hist_k}(t_{prov}) = \frac{\text{count of } l \in D_k \text{ such that } l \leq t_{prov}}{\text{total number of servers in } D_k}$$

At operation 614, the system selects a conservative probability $(p_{conservative})$. That is, from the set of probabilities $\{p_{hist_1}(t_{prov}), \ldots, p_{hist_K}(t_{prov})\}$, the system selects a conservative value. For example, the system may select the $10^{th}$ percentile: $p_{conservative}(t_{prov})=P_{10}(\{p_{hist_k}(t_{prov})\})$. The choice of percentile can be a function of $Cost_{VM}$.

At operations 616-622, the system determines an optimal M. For example, the system determines the smallest integer $M \geq N$ such that a binomial survival function meets the target confidence C: $M^*(t_{prov})=\min\{M \in Z^+ | M \geq N \wedge BSF(N, M, p_{conservative}(t_{prov})) \geq C\}$. The target confidence C itself can also be a function of $Cost_{VM}$.

At operation 624, the system calculates the cost of calculated pair of M and pre-provisioning time, $(t_{prov}, M^*(t_{prov}))$: $Cost(t_{prov}, M^*(t_{prov}))=M^*(t_{prov}) \times t_{prov}$.

At operation 626, the system checks if there are more candidate pre-provisioning times. If yes, then operations 608-624 are performed for the additional candidate pre-provisioning times.

If there are no remaining candidate pre-provisioning times, the system, at operation 628, selects the overall optimal solution (e.g., optimal pair of M and pre-provisioning time that yields the minimal cost). For example, among the evaluated $t_{prov}$ values, the system may choose the pair $$\left(t_{prov}^{opt}, M^{opt}\right)$$

that yields the minimum cost:

$$\left(t_{prov}^{opt}, M^{opt}\right) = argmin_{(t_{prov}, M^*(t_{prov}))}\{Cost(t_{prov}, M^*(t_{prov}))\}.$$

At operation 630, the system returns the requested values based on the selected pair. For example, the system returns the optimal pre-provisioning time, $$t_{prov}^{opt};$$

the optimal number of servers to launch, $M^{opt}$; and the optimal provisioning start time:

$$t_{start}^{opt} = T - t_{prov}^{opt}.$$

The system may also return the predicted latency distribution for the M servers launched a $$t_{start}^{opt},$$

such that the system can determine when each of the N servers before T will arrive, as well as when the remaining M–N overprovisioned servers are likely to arrive. This latency distribution can be the cumulative distribution function (CDF) of the neighbor minute from which $p_{conservative}$ was chosen.

In another aspect of the present disclosure, the system may use rapid predictive preprovisioning techniques for managing the size of a free pool to optimize cost and service reliability. These techniques can continuously project future free pool states by analyzing predicted demand, anticipated server returns, and real-time provisioning latency. For each future time window, the system determines whether a deficit in available VMs is likely to occur. If a deficit is projected, a predictive provisioning latency model, such as those described above with reference to FIGS. 4-6, may be used to calculate the optimal time to start provisioning and the number of VMs to launch. Overprovisioning techniques can be used to account for long-tail latency events and to meet a specified confidence level. Based on the predictive provisioning latency model, if no immediate provisioning is required, the system may evaluate whether excess VMs can be safely released from the free pool without risking future shortages. The system can use a cooldown mechanism to prevent unnecessary churn. The rapid predictive preprovisioning techniques may also incorporate net demand and peak intra-window demand to ensure the free pool is robust against transient spikes as well as sustained load.

Figure 7:
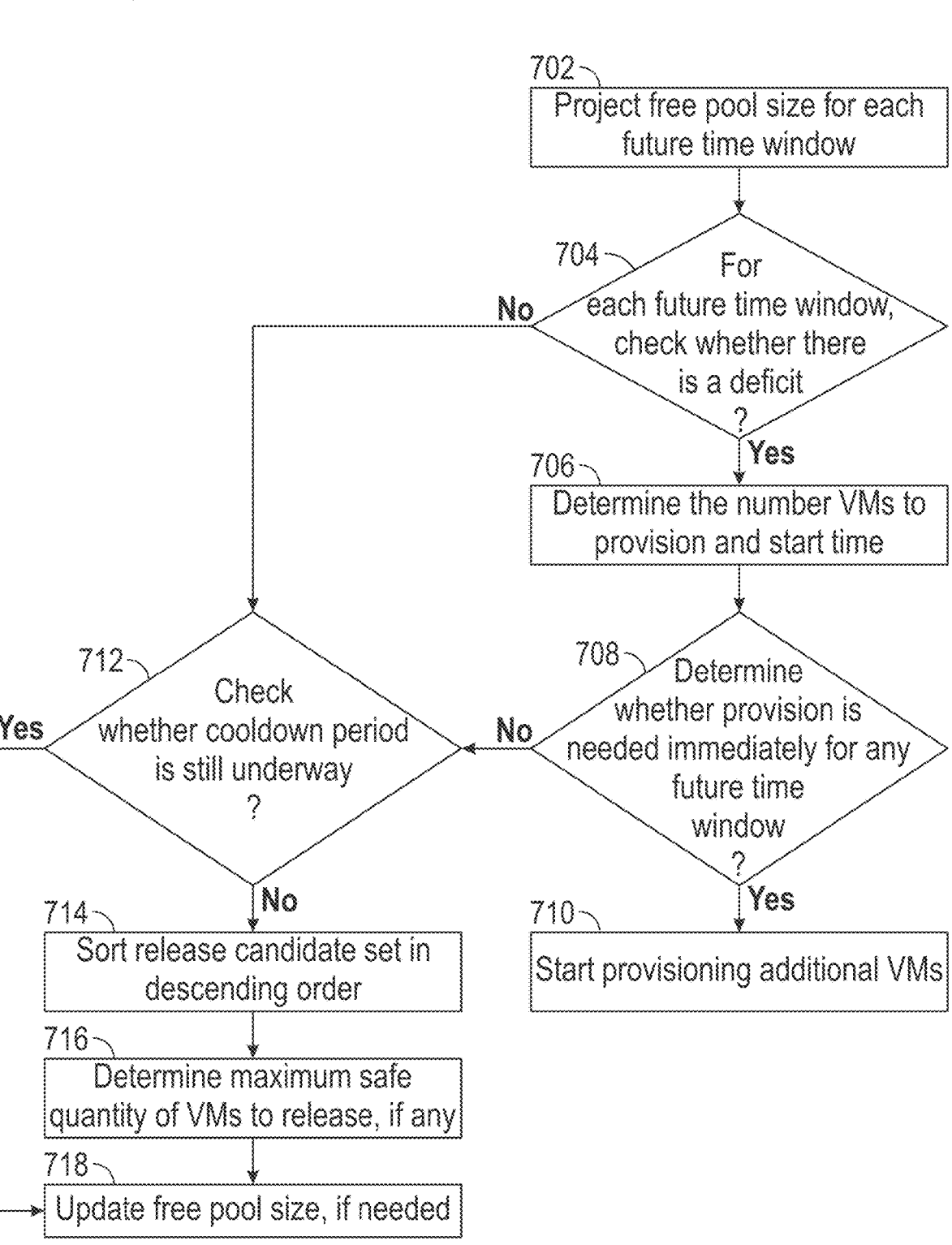
FIG. 7 is a flowchart of a method for rapid predictive provisioning, in accordance with some embodiments of the present disclosure.

FIG. 7 is a flowchart of a method 700 for rapid predictive provisioning, in accordance with some embodiments of the present disclosure. In some examples, the method 700 may be executed by a cloud data platform 102, in particular a free pool sizing manager 109, as described above. The objective of method 700 is to determine, at each decision point, whether to provision or release VMs, and in what quantity, to maintain the free pool at an optimal size for upcoming demand.

At operation 702, the system projects the free pool size for each future time window. The system may have a plurality of future time windows for a defined future time period, such as 30 second future time windows for the next 4 minutes. The projected free pool size for each future time window may be based on a predicted net demand and peak demand. Net demand refers to the total change in the number of VMs required over a specific time window, calculated as the sum of all VMs needed minus any VMs returned to the free pool during that period. Net demand represents the overall increase or decrease in resource requirements from the start to the end of the window, providing a long-term view of how the free pool size should evolve.

Peak demand (or peak intra-window drawdown), on the other hand, captures the maximum number of VMs needed at any single point within the time window, regardless of any subsequent returns or reductions. It reflects the highest instantaneous resource requirement that occurs due to transient spikes in workload. Hence, net demand is used to project the overall trend in resource usage across time windows, while the use of peak demand ensures the system can absorb temporary spikes without running out of available VMs. The system may also factor in known VM returns (VMs expected to become available from virtual warehouses and be released back into the free pool).

At operation 704, for each future time window, the system determines whether a deficit of VMs in the free pool is projected. If no deficit across all future time windows is projected, the system may proceed to check if any VMs can be released (e.g., operation 712), as described in further detail below.

Consider an example scenario in FIG. 8, which shows an example scenario of projected free pool sizes and demands during future time windows. In this example scenario, there is a consistent demand of 100 servers (VMs) in each time window T. The system currently has 200 VMs in the free pool. However, based on the projections, if the system does nothing, the system will run out of VMs during window $T_2$ (the free pool will be short 100 servers by the start of $T_3$). Hence, the system may need to provision VMs in advance such that they will be ready by time $T_2$.

Returning to FIG. 7, if a deficit is projected in respective future time windows, the system, at operation 706, determines the number of VMs to provision and their respective start time. In some examples, the system may use the predicting provisioning latency techniques described above (e.g., FIGS. 4-6). In some examples, the system may use different provisioning techniques, such as naive strategies with no overprovisioning or dynamic provisioning times.

At operation 708, the system may determine whether provisioning is needed immediately for any of the future time windows. For example, the system may check whether the start time for provisioning additional VMs for any of the future time windows is at or before the current time (e.g., before the next decision point), so that immediate provisioning is needed.

If immediate provisioning is needed, the system, at operation 710, may start provisioning of additional VMs based on the determined additional VMs needed. If, however, none of the future time windows require immediate provisioning, the system may proceed to check if any VMs can be released. The release process is described next.

At operation 712, the system may check whether a cooldown period from a previous free pool size adjustment is still underway. For example, the system may check whether the cooldown period expires before the next decision point. If the cooldown period is still underway, the system may maintain the current size of the free pool and update information related to the free pool accordingly (operation 718).

In some examples, the cooldown period check may be incorporated into future release decisions. For example, the system may include a cooldown period in its assessment of when a release activity might trigger the next provisioning action to occur. If the next provisioning action is after the cooldown period, the system may proceed with the release activity.

If the cooldown period has expired, the system, at operation 714, may sort release candidates set of VMs in descending order, from greatest to smallest number of VMs to release. At operation 716, the system may determine the maximum safe quantity of VMs to release, if any, based on the sorted list. For example, the system may check if future deficits can still be met without violating cooldown restraints if VMs are released. In some examples, the system may perform a binary search over the search space of the release candidates set to determine the quantity of VMs to release, if any. At operation 718, the system may update its free pool size by maintaining current size or releasing one or more VMs, if needed.

Method 700 may be continuously performed at each decision point. Notably, VMs are provisioned only when the system determines that, for a future deficit, the predicted start provisioning time is at or before the current time (or before the next decision point). If the predicted start provisioning time for the deficit is not at or before the current time (i.e., at or after the next decision point), the system does not start provisioning any VMs for that deficit. Instead, the system continuously runs the method 700 at each decision point because conditions, such as the predicted provisioning times and demand may change. Thus, the rapid predictive provisioning techniques can enable the cloud data platforms to maintain high availability of VMs in the free pool while significantly reducing idle resource costs.

Figure 9:
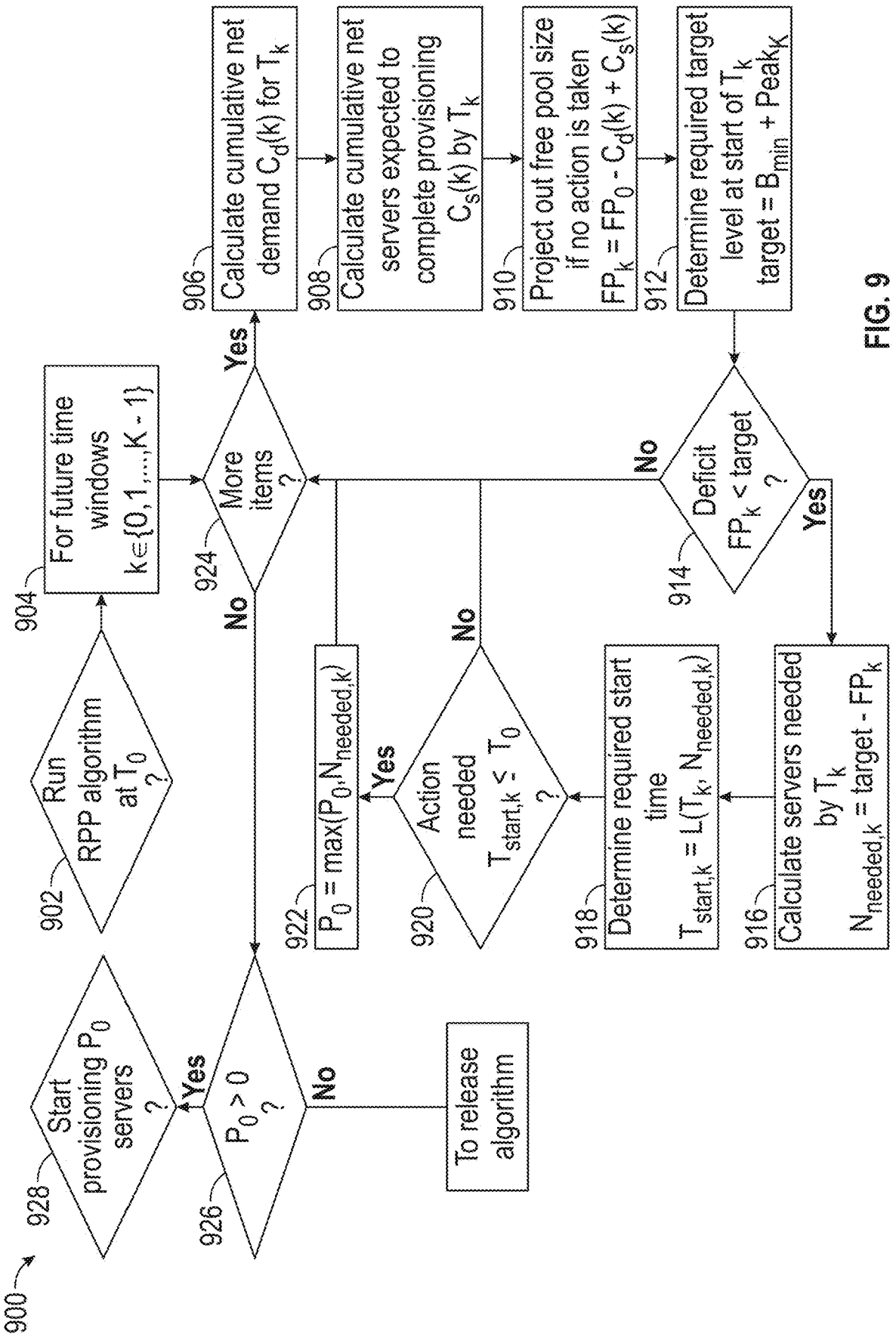
FIG. 9 is a flowchart of a method for a provisioning section of rapid predictive provisioning, in accordance with some embodiments of the present disclosure.

FIG. 9 is a flowchart of a method 900 for a provisioning section of rapid predictive provisioning, in accordance with some embodiments of the present disclosure. In some examples, the method 900 may be executed by a cloud data platform 102, in particular a free pool sizing manager 109, as described above. The objective of method 900 is to calculate the number of servers $P_0$, if any, that should start provisioning at the current time, $T_0$, to meet future demands that cannot wait. Provisioning that does not need to start at $T_0$ are not relevant because the system will not provision them now.

At operation 902, the system initiates the provisioning section of the rapid predictive provisioning algorithm at the current time $T_0$. The system initializes the provisioning quantity, setting $P_0=0$. This variable will accumulate the maximum number of servers needing provisioning initiated at $T_0$.

At operation 904, an iterative process for each future time window is executed to determine the provisioning quantity for the respective future time windows ($k \in \{0, 1, \ldots, K-1\}$).

At operation 906, the system calculates cumulative net demand, which is the total servers consumed (or returned) from $T_0$ up to the beginning of window $T_k$: using advanced statistical methods:

$$C_D(k) = \sum_{j=0}^{k-1} D_j$$

$C_D(k)$ represents the total change in the free pool size due to demands (D) from $T_0$ until $T_k$ begins. Note: For k=0, $C_D(0)=0$ as the sum is empty.

At operation 908, the system calculates the cumulative net servers anticipated to complete provisioning $C_s(k)$ between $T_0$ and the start of $T_k$:

$$C_s(k) = \sum_{j=0}^{k-1} S_j$$

$C_s(k)$ represents the total number of already provisioning servers that the system requested for in prior windows that will arrive by the start of $T_k$.

At operation 910, the system projects baseline free pool size if no action is taken by the system. The system calculates the free pool size at the start of $T_k$ assuming no new provisioning ($P_0$=0) or releases ($R_0$=0) occur at $T_0$:

$$FP_k = FP_0 - C_D(k) + C_s(k)$$

$FP_k$ represents the "do nothing now" projection of the free pool at the start of window k. The system takes the current free pool size $FP_0$ minus the demand $C_D(k)$, plus the already in-provisioning servers $C_s(k)$ that would arrive by this time.

At operation 912, the system determines a required target level at the start of $T_k$:

$$target = B_{min} + Peak_K,$$

where $Peak_K$ is the predicted peak drawdown between $T_k$ and $T_{k+1}$.

At operation 914, the system checks for a deficit by determining if the projected baseline free pool drops below the target level ($FP_k$<target). If there is no deficit, $P_0$ remains at zero, and the system proceeds to processing the next future time window if any (operation 924).

If there is a deficit, the system, at operation 916, calculates the number of servers needed:

$$N_{needed,k} = target - FP_k$$

At operation 918, the system determines the provisioning start time for the needed servers. For example, the system may employ the latency predictor L, as described above, to determine when provisioning for $N_{needed,k}$ must begin to be ready by $T_k$:

$$T_{start,k} = L(T_k, N_{needed,k})$$

The function L provides the cost-optimal time $T_{start,k}$ to start provisioning of $N_{needed,k}$ servers, such that they are available by the start of $T_k$.

At operation 920, the system determines if provisioning action is needed by comparing the provisioning start time with the current time ($T_{start,k} \leq T_0$).

At operation 922, the provisioning quantity is determined:

$$P_0 = max(P_0, N_{needed,k})$$

If multiple future deficits ($T_{k1}$, $T_{k2}$, . . . ) require provisioning to start by $T_0$, $P_0$ must be large enough to cover the single largest deficit amount them ($N_{needed,k_i}$). This assumes a single batch of $P_0$ servers provisioned at $T_0$ would cover these needs if $P_0$ is greater than or equal to each such $N_{needed,k_i}$.

At operation 924, the system checks if there are more future time windows. If yes, then operations 906-922 are performed for the additional future time windows.

If there are no remaining future time windows, the system, at operation 926, determines if the provisioning quantity $P_0$ that has been determined based on the set of future time windows is greater than 0 ($P_0$>0).

If $P_0$ is greater than 0, the system, at operation 928, starts provisioning $P_0$ servers, starting at $T_0$. Consequently, the system will not be releasing any servers at $T_0$ ($R_0$=0).

If $P_0$ is equal to 0, no immediate provisioning is required based on the current state. The system may consider releasing VMs, as described below.

Figure 10:
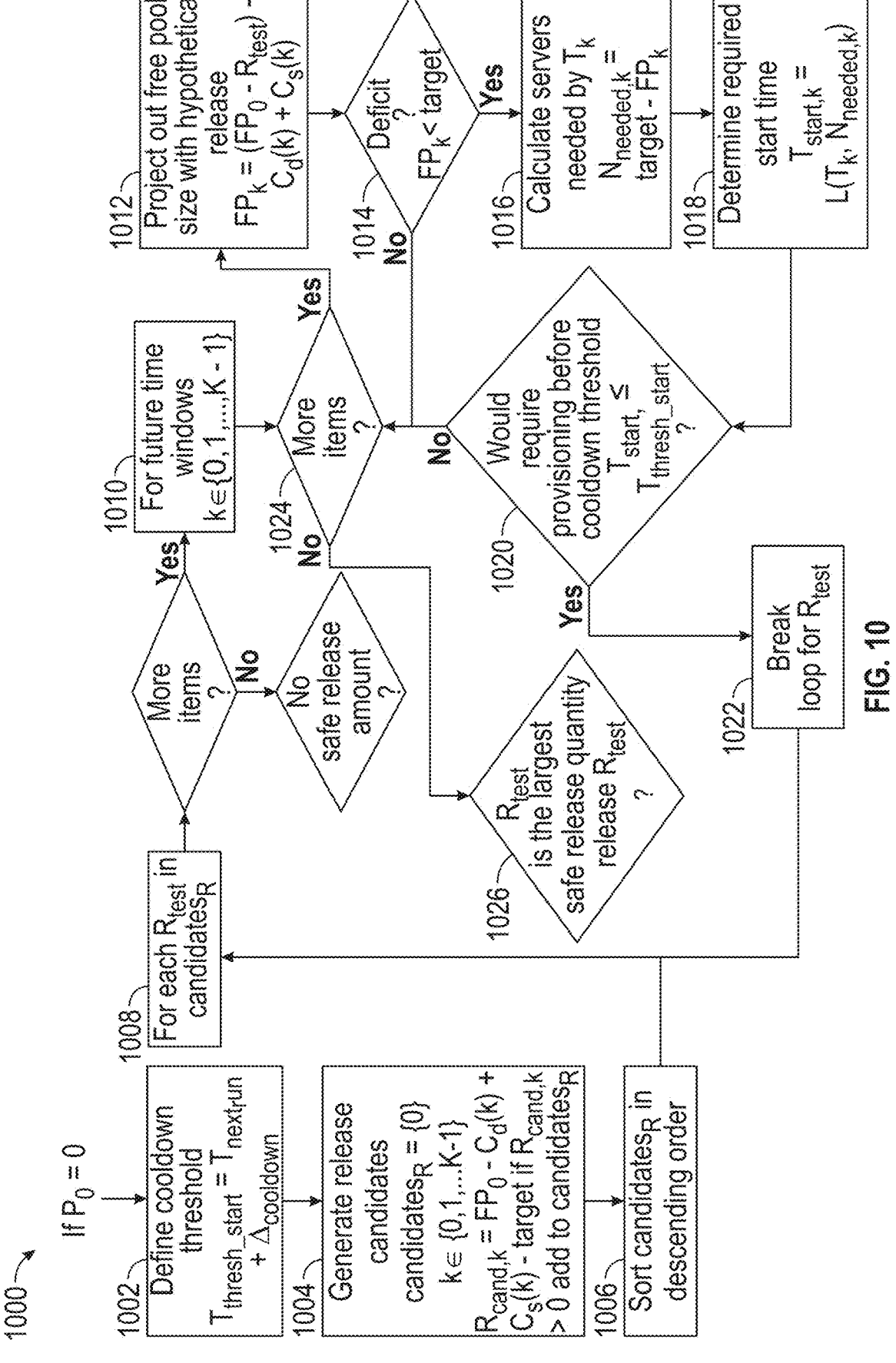
FIG. 10 is a flowchart of a method for a releasing section of rapid predictive provisioning, in accordance with some embodiments of the present disclosure.

FIG. 10 is a flowchart of a method 1000 for a releasing section of rapid predictive provisioning, in accordance with some embodiments of the present disclosure. In some examples, the method 1000 may be executed by a cloud data platform 102, in particular a free pool sizing manager 109, as described above. The system checks if any VMs can be safely released after the system determines that no VMs need to be provisioned at the current time ($P_0$=0). The objective of method 1000 is to determine the maximum $R_0$ (servers to release at $T_0$) such that no future deficit is created that would require provisioning to start before $T_{next\_run}$+$\Delta_{cooldown}$. Hence, the release quantity is initialized, by setting $R_0$=0. This is the default (conservative) decision if the system is unable to find a safer larger release amount.

At operation 1002, the system defines the cooldown threshold based on the next run time (decision point) and the cooldown period:

$$T_{threshold\_start\_time} = T_{next\_run} + \Delta_{cooldown}$$

The cooldown threshold is the earliest time a provisioning task triggered by this release can safely start.

At operation 1004, the system generates set of candidate release amounts $Candidates_R$. These candidates are amounts that, if released, would cause the free pool at some future time $T_K$ to be exactly the target, considering only demands and arriving servers up to $T_K$.

$$Candidates_R = \{0\}$$

For $k \in \{0, 1, . . . , K-1\}$:

Let $R_{cand,k} = FP_0 - C_D(k) + C_s(k) - B_{min}$.

If $R_{cand,k}$>0 add $R_{cand,k}$ to $Candidates_R$.

$Candidates_R$ is a set, so it stores only unique values. Each $R_{cand,k}$ is the number of servers that could be released if $T_K$ were the only future constraint, aiming for $FP_k$=target. Releasing nothing (R=0) is always a candidate. We only consider positive release amounts. $FP_o$–target is effectively included via $R_{cand,0}$ if $C_d(0)$=0. The At operation 1006, the system sorts the $Candidates_R$ in descending order. This is an optimization to ensure the system tests larger potential releases first.

At operation 1008, the system tests each candidate release amounts $R_{test}$ in the sorted candidate list $Candidates_R$ in an iterative outer loop of the process.

At operation 1010, the system checks the impact of the respective $R_{test}$ on the future windows in an iterative inner loop of the process.

At operation 1012, the system projects free pool size with hypothetical release. For example, system calculates pool size at $T_k$ if $R_{test}$ servers are released:

$$FP_k = (FP_0 - R_{test}) - C_D(k) + C_s(k)$$

At operation 1014, the system checks if the projected pool size would result in a deficit based on the target free pool size ($FP_k$<target). If no deficit is projected, then the system checks the next future window size, if any, in the inner loop (operation 1024).

If a deficit is projected, the system, at operation 1016, determines the servers needed by $T_k$:

$$N_{needed,k} = target - FP_k$$

At operation 1018, the system determines the required provisioning start time for the projected deficit:

$$T_{start,k} = L(T_k, N_{needed,k})$$

At operation 1020, the system checks against cooldown threshold. For example, the system checks if the provisioning for this new deficit is before cooldown threshold ($T_{start,k} \leq T_{threshold\_start}$).

If the projected start time is less than or equal to the cooldown threshold, the system may break the inner loop, at operation 1022, and check the next candidate release amounts $R_{test}$ in the sorted candidate list $Candidates_R$ (operation 1008). The reason is that releasing $R_{test}$ servers here creates a deficit at $T_k$ that requires provisioning sooner than the acceptable $T_{threshold\_start}$ (which incorporates $T_{next\_run}$ and $\Delta_{cooldown}$). This violates the anti-churn/cooldown objective, and thus, $R_{test}$ is considered an unsafe release amount If the projected start time does not exceed the cooldown threshold, $R_{test}$ is considered safe for that future time window. $R_{test}$ is evaluated for the remaining future time windows in the inner loop (operation 1024). If after evaluating all k windows, $R_{test}$ is considered a safe release amount, then $R_0 = R_{test}$ is set, at operation 1026, as the largest safe release quantity and is released. The system breaks from the outer loop (over $R_{test}$) because the system sorted candidates from largest first, this $R_{test}$ is the maximum safe amount to release. Thus, the system determines this $R_{test}$ will not cause any unmanageable short-term deficits in any future window.

In view of the disclosure above, various examples are set forth below. It should be noted that one or more features of an example, taken in isolation or combination, should be considered within the disclosure of this application.

Example 1. A method comprising: determining, by a cloud data platform, a set of candidate pre-provisioning times for compute resources to be provisioned from a cloud provider service to a free pool maintained by the cloud platform, the set of candidate pre-provisioning times being based on a demand of compute resources (N) and a target time; for each candidate pre-provisioning time: finding similar historical periods based on historical distribution of provisioning latencies; for each historical period of the similar historical periods, determining a minimum number of compute resources (M) to provision at the candidate pre-provisioning time so that at least N compute resources are ready by the target time within a specified confidence; and calculating a cost metric for pair of M and candidate pre-provisioning time; and selecting a pair of M and candidate pre-provisioning time based on the calculated cost metrics; and causing the provisioning of the selected M number of compute resources at the selected pre-provisioning time from the cloud provider service to add to the free pool Example 2. The method of example 1, wherein M is greater than or equal to N.

Example 3. The method of any of examples 1-2, wherein provisioning comprises loading software related to the cloud data platform on the provisioned compute resources.

Example 4. The method of any of examples 1-3, wherein finding the similar historical periods is performed using a k-nearest neighbor algorithm based on context features.

Example 5. The method of any of examples 1-4, further comprising: determining a probability that provisioning a single compute resource is completed within the candidate pre-provisioning time; and selecting a specified probability, wherein determining the minimum number of M compute resources is based on the specified probability.

Example 6. The method of any of examples 1-5, wherein determining the minimum number of M compute resources is performed using a binomial survival function where the specified probability is a variable in the binomial survival function or a bootstrapping technique.

Example 7. The method of any of examples 1-6, further comprising: projecting free pool size for each of a set of future time windows; for at least one future time window of the set of future time windows, determining a deficit of compute resources in the free pool is projected; determining whether to provision new compute resources at a current time based on a future number of compute resources and start time to meet the deficit by comparing the current time to the start time; initiating provisioning of the future number of compute resources if provisioning is needed at the current time; and not initiating provisioning if no provisioning is not needed at the current time.

Example 8. The method of any of examples 1-7, wherein the future number of compute resources and start time is determined based on an overprovisioning algorithm.

Example 9. The method of any of examples 1-8, further comprising: determining that no compute resources are to be provisioned at a current time; sorting release candidates in a release candidate set in descending order; determining a maximum safe quantity of compute resources to release based on the sorted release candidates; and releasing the maximum safe quantity of compute resources from the free pool to the cloud provider service.

Example 10. A system comprising: one or more processors of a machine; and a memory storing instructions that, when executed by the one or more processors, cause the machine to perform operations implementing any one of example methods 1 to 9.

Example 11. A machine-storage medium embodying instructions that, when executed by a machine, cause the machine to perform operations implementing any one of example methods 1 to 9.

Figure 11:
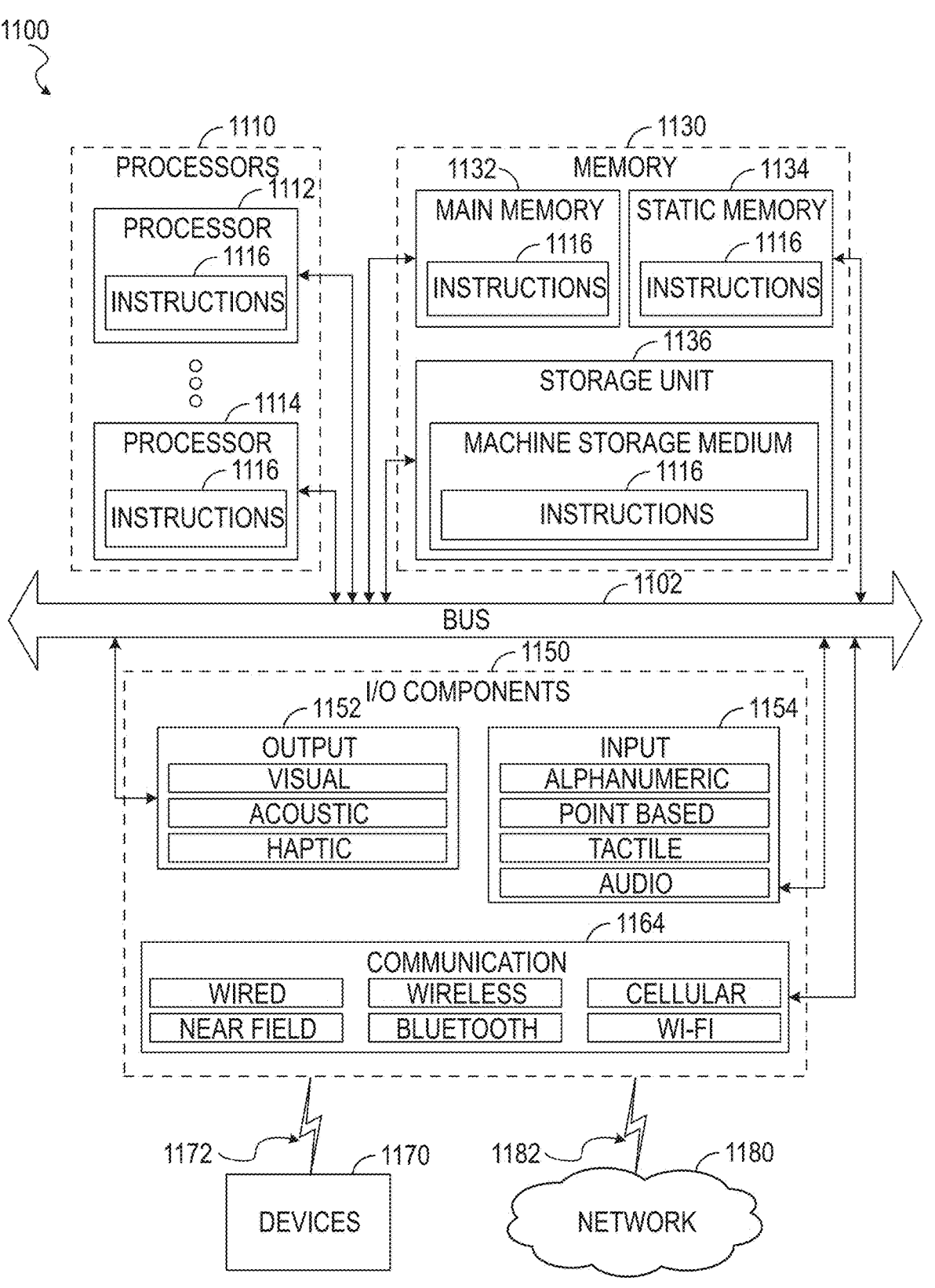
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., a software, a program, an application, an applet, an app, or other executable code) for causing the machine 1100 to perform any one or more of the methodologies discussed herein may be executed. For example, the instructions 1116 may cause the machine 1100 to execute any one or more operations of the free pool sizing methods described herein. As another example, the instructions 1116 may cause the machine 1100 to implement any one or more portions of the functionality illustrated in any one of FIGS. 1, 2, and 3. In this way, the instructions 1116 transform a general, non-programmed machine into a particular machine that is specially configured to carry out any one of the described and illustrated functions of the cloud data platform 102 such as the compute service manager 108 (or a component thereof such as the free pool sizing manager 109) or an execution node of the execution platform 110.

In some embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and I/O components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1114 and a processor 1112 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the compute service manager 108, the execution platform 110, and the devices 1170 may include the data store 206 or any other computing device described herein as being in communication with the cloud data platform 102 or the data storage 104.

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the method 400 may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   determining, by a cloud data platform, a set of candidate pre-provisioning times for compute resources to be provisioned from a cloud provider service to a free pool maintained by the cloud platform, the set of candidate pre-provisioning times being based on a demand of compute resources (N) and a target time;
   for each candidate pre-provisioning time:
      finding similar historical periods based on historical distribution of provisioning latencies;
      for each historical period of the similar historical periods, determining a minimum number of compute resources (M) to provision at the candidate pre-provisioning time so that at least N compute resources are ready by the target time within a specified confidence; and
      calculating a cost metric for pair of M and candidate pre-provisioning time; and
   selecting a pair of M and candidate pre-provisioning time based on the calculated cost metrics; and
   causing the provisioning of the selected M number of compute resources at the selected pre-provisioning time from the cloud provider service to add to the free pool.

2. The system of claim 1, wherein M is greater than or equal to N.

3. The system of claim 1, wherein provisioning comprises loading software related to the cloud data platform on the provisioned compute resources.

4. The system of claim 1, wherein finding the similar historical periods is performed using a k-nearest neighbor algorithm based on context features.

5. The system of claim 1, wherein the operations further comprise:

determining a probability that provisioning a single compute resource is completed within the candidate pre-provisioning time; and selecting a specified probability, wherein determining the minimum number of M compute resources is based on the specified probability.

6. The system of claim 5, wherein determining the minimum number of M compute resources is performed using a binomial survival function where the specified probability is a variable in the binomial survival function or a bootstrapping technique.

7. The system of claim 1, wherein the operations further comprise:

projecting free pool size for each of a set of future time windows;

for at least one future time window of the set of future time windows, determining a deficit of compute resources in the free pool is projected;

determining whether to provision new compute resources at a current time based on a future number of compute resources and start time to meet the deficit by comparing the current time to the start time;

initiating provisioning of the future number of compute resources if provisioning is needed at the current time; and not initiating provisioning if no provisioning is not needed at the current time.

8. The system of claim 7, wherein the future number of compute resources and start time is determined based on an overprovisioning algorithm.

9. The system of claim 1, the operations further comprise:

determining that no compute resources are to be provisioned at a current time;

sorting release candidates in a release candidate set in descending order;

determining a maximum safe quantity of compute resources to release based on the sorted release candidates; and releasing the maximum safe quantity of compute resources from the free pool to the cloud provider service.

10. A method comprising:

determining, by a cloud data platform, a set of candidate pre-provisioning times for compute resources to be provisioned from a cloud provider service to a free pool maintained by the cloud platform, the set of candidate pre-provisioning times being based on a demand of compute resources (N) and a target time;

for each candidate pre-provisioning time:

finding similar historical periods based on historical distribution of provisioning latencies;

for each historical period of the similar historical periods, determining a minimum number of compute resources (M) to provision at the candidate pre-provisioning time so that at least N compute resources are ready by the target time within a specified confidence; and calculating a cost metric for pair of M and candidate pre-provisioning time; and selecting a pair of M and candidate pre-provisioning time based on the calculated cost metrics; and causing the provisioning of the selected M number of compute resources at the selected pre-provisioning time from the cloud provider service to add to the free pool.

11. The method of claim 10, wherein M is greater than or equal to N.

12. The method of claim 10, wherein provisioning comprises loading software related to the cloud data platform on the provisioned compute resources.

13. The method of claim 10, wherein finding the similar historical periods is performed using a k-nearest neighbor algorithm based on context features.

14. The method of claim 10, further comprising:

determining a probability that provisioning a single compute resource is completed within the candidate pre-provisioning time; and selecting a specified probability, wherein determining the minimum number of M compute resources is based on the specified probability.

15. The method of claim 14, wherein determining the minimum number of M compute resources is performed using a binomial survival function where the specified probability is a variable in the binomial survival function or a bootstrapping technique.

16. The method of claim 10, further comprising:

projecting free pool size for each of a set of future time windows;

for at least one future time window of the set of future time windows, determining a deficit of compute resources in the free pool is projected;

determining whether to provision new compute resources at a current time based on a future number of compute resources and start time to meet the deficit by comparing the current time to the start time;

initiating provisioning of the future number of compute resources if provisioning is needed at the current time; and not initiating provisioning if no provisioning is not needed at the current time.

17. The method of claim 16, wherein the future number of compute resources and start time is determined based on an overprovisioning algorithm.

18. The method of claim 10, further comprising:

determining that no compute resources are to be provisioned at a current time;

sorting release candidates in a release candidate set in descending order;

determining a maximum safe quantity of compute resources to release based on the sorted release candidates; and releasing the maximum safe quantity of compute resources from the free pool to the cloud provider service.

19. A machine-storage medium embodying instructions that, when executed by a machine, cause the machine to perform operations comprising:

determining, by a cloud data platform, a set of candidate pre-provisioning times for compute resources to be provisioned from a cloud provider service to a free pool maintained by the cloud platform, the set of candidate pre-provisioning times being based on a demand of compute resources (N) and a target time;

for each candidate pre-provisioning time:

finding similar historical periods based on historical distribution of provisioning latencies;

for each historical period of the similar historical periods, determining a minimum number of compute resources (M) to provision at the candidate pre-provisioning time so that at least N compute resources are ready by the target time within a specified confidence; and calculating a cost metric for pair of M and candidate pre-provisioning time; and selecting a pair of M and candidate pre-provisioning time based on the calculated cost metrics; and causing the provisioning of the selected M number of compute resources at the selected pre-provisioning time from the cloud provider service to add to the free pool.

20. The machine-storage medium of claim 19, wherein M is greater than or equal to N.

* * * * *